United States Patent
Kato

(10) Patent No.: US 11,688,867 B2
(45) Date of Patent: Jun. 27, 2023

(54) FUEL CELL SYSTEM

(71) Applicant: TOYOTA JIDOSHA KABUSHIKI KAISHA, Toyota (JP)

(72) Inventor: Tokio Kato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/654,124

(22) Filed: Mar. 9, 2022

(65) Prior Publication Data

US 2022/0293979 A1   Sep. 15, 2022

(30) Foreign Application Priority Data

Mar. 10, 2021   (JP) .............................. JP2021-038189

(51) Int. Cl.
| | | |
|---|---|---|
| *H01M 8/04537* | (2016.01) | |
| *H01M 8/04858* | (2016.01) | |
| *H01M 8/1004* | (2016.01) | |
| *H01M 8/0213* | (2016.01) | |

(52) U.S. Cl.
CPC ... *H01M 8/04552* (2013.01); *H01M 8/04902* (2013.01); *H01M 8/1004* (2013.01); *H01M 8/0213* (2013.01); *H01M 2250/20* (2013.01); *H01M 2300/0082* (2013.01)

(58) Field of Classification Search
CPC ..... H01M 2008/1095; H01M 2250/20; H01M 2300/0082; H01M 8/0213; H01M 8/04298; H01M 8/04552; H01M 8/04559; H01M 8/04679; H01M 8/04902; H01M 8/0491; H01M 8/04952; H01M 8/1004; Y02E 60/50
See application file for complete search history.

(56) References Cited

FOREIGN PATENT DOCUMENTS

| | | |
|---|---|---|
| JP | 2012084245 A | 4/2012 |
| JP | 2014049266 A | 3/2014 |
| JP | 2015018701 A | 1/2015 |

*Primary Examiner* — Victoria H Lynch
(74) *Attorney, Agent, or Firm* — Dickinson Wright, PLLC

(57) ABSTRACT

To provide a fuel cell system capable of evaluating degradation of an electrolyte membrane by quantifying metal ions involved in degradation of an electrolyte membrane instead of evaluating degradation of an electrolyte membrane itself. A fuel cell system comprising a fuel cell, a fuel gas system for supplying fuel gas to an anode of the fuel cell, an oxidant gas system for supplying oxidant gas to a cathode of the fuel cell, a voltage detector for detecting a voltage of the fuel cell, and a controller.

6 Claims, 5 Drawing Sheets

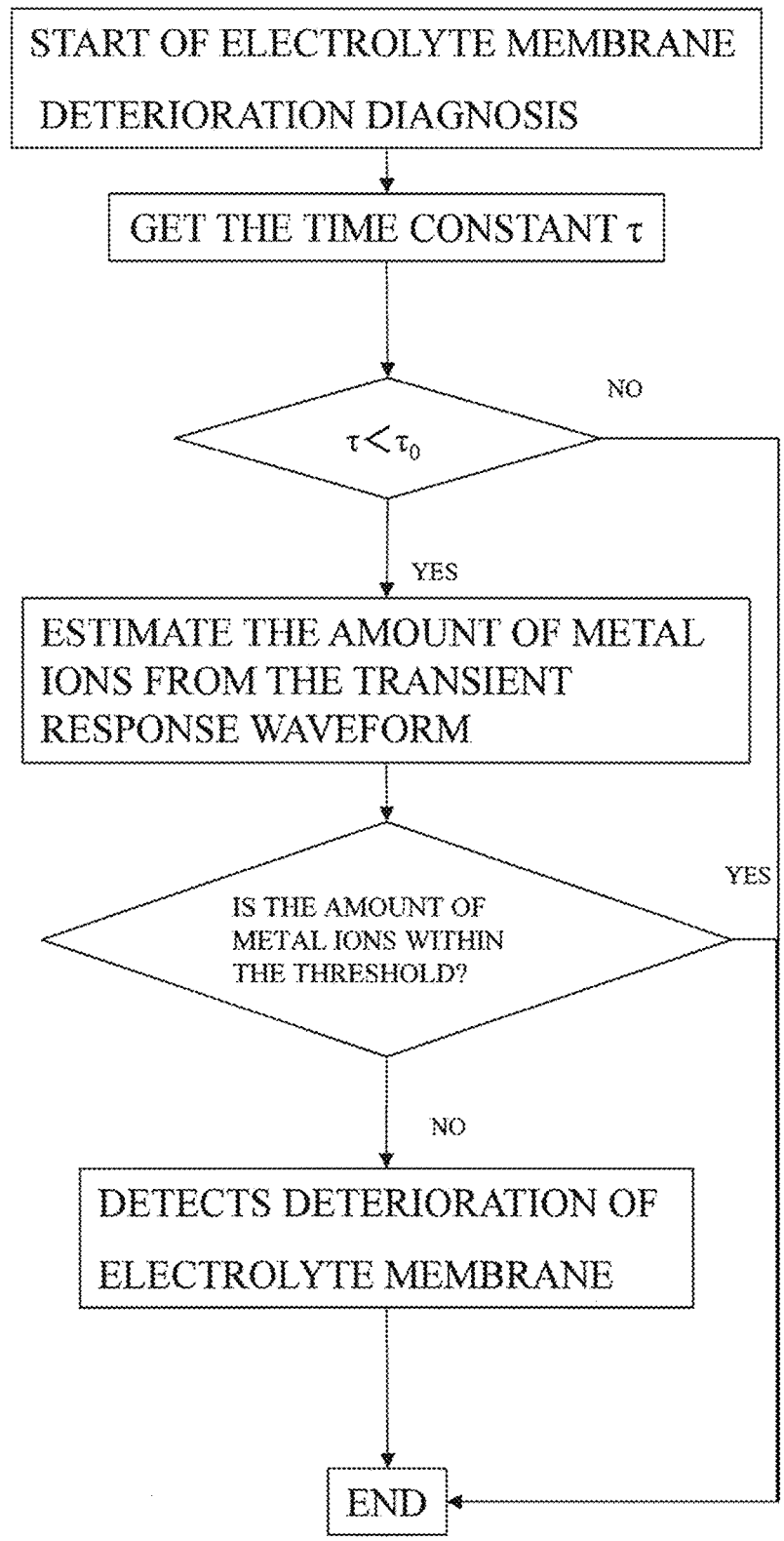

FUEL CELL SYSTEM

TECHNICAL FIELD

The present disclosure relates to a fuel cell system.

BACKGROUND

A fuel cell (FC) is a power generation device that generates electrical energy by electrochemical reaction between fuel gas (e.g., hydrogen) and oxidant gas (e.g., oxygen) in a single unit fuel cell or a fuel cell stack (hereinafter, it may be referred to as "stack") composed of stacked unit fuel cells (hereinafter may be referred to as "cell"). In many cases, the fuel gas and oxidant gas actually supplied to the fuel cell, are mixtures with gases that do not contribute to oxidation and reduction. Especially, the oxidant gas is often air containing oxygen.

Hereinafter fuel gas and oxidant gas may be collectively and simply referred to as "reaction gas" or "gas". Also, a single unit fuel cell and a fuel cell stack composed of stacked unit cells may be referred to as "fuel cell".

In general, the unit fuel cell includes a membrane-electrode assembly (MEA).

The membrane electrode assembly has a structure such that a catalyst layer and a gas diffusion layer (or GDL, hereinafter it may be simply referred to as "diffusion layer") are sequentially formed on both surfaces of a solid polymer electrolyte membrane (hereinafter, it may be simply referred to as "electrolyte membrane"). Accordingly, the membrane electrode assembly may be referred to as "membrane electrode gas diffusion layer assembly" (MEGA).

As needed, the unit fuel cell includes two separators sandwiching both sides of the membrane electrode gas diffusion layer assembly. In general, the separators have a structure such that a groove is formed as a reaction gas flow path on a surface in contact with the gas diffusion layer. The separators have electronic conductivity and function as a collector of generated electricity.

In the fuel electrode (anode) of the fuel cell, hydrogen ($H_2$) as the fuel gas supplied from the gas flow path and the gas diffusion layer, is protonated by the catalytic action of the catalyst layer, and the protonated hydrogen goes to the oxidant electrode (cathode) through the electrolyte membrane. An electron is generated at the same time, and it passes through an external circuit, does work, and then goes to the cathode. Oxygen ($O_2$) as the oxidant gas supplied to the cathode reacts with protons and electrons in the catalytic layer of the cathode, thereby generating water. The generated water gives appropriate humidity to the electrolyte membrane, and excess water penetrates the gas diffusion layer and then is discharged to the outside of the system.

Various studies have been made on fuel cell systems configured to be installed and used in fuel cell electric vehicles (hereinafter may be referred to as "vehicle").

For example, Patent Literature 1 discloses a fuel cell system configured to determine the degradation state of an electrolyte membrane without separately providing a conventional device.

Patent Literature 2 discloses the method of measuring the resistance of the electrolyte membrane of a fuel cell with high accuracy by a current cut-off method.

Patent Literature 3 discloses a device for detecting the cause of degradation in detail so that, when a fuel cell mounted in a vehicle degrades, an operation for recovering from the degradation is conducted in appropriate conditions.

Patent Literature 1: Japanese Patent Application Laid-Open (JP-A) No. 2012-084245
Patent Literature 2: JP-A No. 2014-049266
Patent Literature 3: JP-A No. 2015-018701

The electrolyte membrane is a core member of the fuel cell, and it has a dominant influence on the lifetime of the fuel cell. It is difficult to predict and detect the degradation of the electrolyte membrane, since it rapidly progresses when specific conditions are met, and it is also difficult to find the degradation at the time of inspection and maintenance. Accordingly, it is desirable to be able to grasp the degradation state at an early stage.

The fuel cell system of Patent Literature 1 diagnoses the degradation of the electrolyte membrane from voltage responsivity. It focuses on how much voltage of the fuel cell drops from the beginning. In the technique of Patent Literature 1, accordingly, the diagnosis of the degradation of the electrolyte membrane is allowed after the sulfonic acid group of the electrolyte polymer is decomposed due to the progress of the degradation of the electrolyte membrane, and the resistance of the electrolyte membrane is increased, so that the power generation performance is lowered. As described above, the method of observing the degradation of the electrolyte polymer itself is effective when the degradation progresses remarkably. However, it is difficult to detect the degradation at the initial stage. Accordingly, there is a need for a technique that can diagnose the degradation of the electrolyte membrane before the degradation of the electrolyte membrane progresses remarkably.

SUMMARY

The disclosed embodiments were achieved in light of the above circumstances. An object of the disclosed embodiments is to provide a fuel cell system configured to evaluate the degradation of an electrolyte membrane by quantifying metal ions involved in the degradation of the electrolyte membrane, instead of evaluating the degradation of the electrolyte membrane itself.

In a first embodiment, there is provided a fuel cell system comprising:
a fuel cell,
a fuel gas system for supplying fuel gas to an anode of the fuel cell,
an oxidant gas system for supplying oxidant gas to a cathode of the fuel cell,
a voltage detector for detecting a voltage of the fuel cell, and
a controller,
wherein the controller preliminarily stores an initial time constant $\tau 0$ derived from a first transient response waveform of the voltage of the fuel cell, which is obtained by increasing an output current value of the fuel cell in a predetermined output current value increasing condition at the time of initial operation of the fuel cell;
wherein the controller preliminarily stores a data group indicating a relationship between a second transient response waveform of the voltage of the fuel cell, which is obtained by increasing the output current value of the fuel cell in the predetermined output current value increasing condition, and an amount of metal ions contained in an electrolyte membrane of the fuel cell;
wherein the controller diagnoses degradation of the electrolyte membrane of the fuel cell at a predetermined time;
wherein, in the electrolyte membrane degradation diagnosis, the controller acquires a time constant $\tau$ derived from the second transient response waveform;

wherein the controller determines whether or not the time constant $\tau$ is smaller than the initial time constant $\tau 0$;

wherein, when the controller determines that the time constant $\tau$ is smaller than the initial time constant $\tau 0$, the controller estimates the amount of the metal ions by comparing the second transient response waveform with the data group;

wherein the controller determines whether or not the estimated amount of the metal ions is within a predetermined threshold range; and wherein, when the controller determines that the estimated amount of the metal ions is outside the predetermined threshold range, the controller diagnoses the electrolyte membrane as being degraded.

The metal ions may be at least one kind of metal ions selected from the group consisting of Ce ions, Fe ions, Al ions and Ti ions.

The metal ions may be Fe ions; the controller may determine whether or not the estimated amount of the Fe ions exceeds a predetermined threshold; and when the controller determines that the estimated amount of the Fe ions exceeds the predetermined threshold, the controller may diagnose the electrolyte membrane as being degraded.

The predetermined output current value increasing condition may be a condition for operating the fuel cell by, when the fuel cell is operated at the first current density, switching the first current density to a second current density which is larger than the first current density.

The second current density may be 10 to 60 times the first current density.

In determining whether or not the time constant $\tau$ is smaller than the initial time constant $\tau 0$, the controller may determine whether or not the time constant $\tau$ is equal to or less than 90% of the initial time constant $\tau 0$ when the initial time constant $\tau 0$ is regarded as 100%.

According to the fuel cell system of the disclosed embodiments, the degradation of the electrolyte membrane can be evaluated by quantifying the metal ions involved in the degradation of the electrolyte membrane, instead of evaluating the degradation of the electrolyte membrane itself.

BRIEF DESCRIPTION OF THE DRAWINGS

In the accompanying drawings,

FIG. 9 is a flowchart illustrating an example of the control of the fuel cell system of the disclosed embodiments.

DETAILED DESCRIPTION

The fuel cell system of the disclosed embodiments is a fuel cell system comprising:

a fuel cell, a fuel gas system for supplying fuel gas to an anode of the fuel cell, an oxidant gas system for supplying oxidant gas to a cathode of the fuel cell, a voltage detector for detecting a voltage of the fuel cell, and a controller, wherein the controller preliminarily stores an initial time constant $\tau 0$ derived from a first transient response waveform of the voltage of the fuel cell, which is obtained by increasing an output current value of the fuel cell in a predetermined output current value increasing condition at the time of initial operation of the fuel cell;

wherein the controller preliminarily stores a data group indicating a relationship between a second transient response waveform of the voltage of the fuel cell, which is obtained by increasing the output current value of the fuel cell in the predetermined output current value increasing condition, and an amount of metal ions contained in an electrolyte membrane of the fuel cell;

wherein the controller diagnoses degradation of the electrolyte membrane of the fuel cell at a predetermined time;

wherein, in the electrolyte membrane degradation diagnosis, the controller acquires a time constant $\tau$ derived from the second transient response waveform;

wherein the controller determines whether or not the time constant $\tau$ is smaller than the initial time constant $\tau 0$;

wherein, when the controller determines that the time constant $\tau$ is smaller than the initial time constant $\tau 0$, the controller estimates the amount of the metal ions by comparing the second transient response waveform with the data group;

wherein the controller determines whether or not the estimated amount of the metal ions is within a predetermined threshold range; and wherein, when the controller determines that the estimated amount of the metal ions is outside the predetermined threshold range, the controller diagnoses the electrolyte membrane as being degraded.

The degradation of the electrolyte membrane rapidly progresses when certain conditions are met. Accordingly, the method for evaluating the degradation of the electrolyte membrane itself is effective for detecting the electrolyte membrane in which the degradation has already progressed and which has reached the life. On the other hand, it is difficult to predict and detect the degrading electrolyte membrane.

The degradation of the electrolyte membrane is greatly affected by the amount of the metal ions contained in the electrolyte membrane. More specifically, the degradation of the electrolyte membrane is greatly affected by the amount of the metal ions which accelerate the degradation and the amount of the metal ions which suppress the degradation. Of the metal ions, it is widely known that those which suppress the degradation of the electrolyte membrane are mainly Ce ions, and those which accelerate the degradation are Fe ions.

Figure 1:
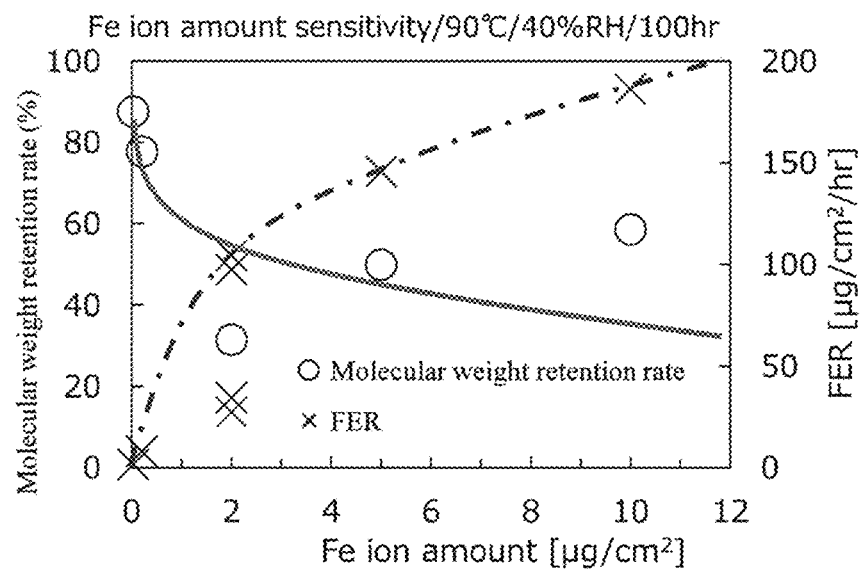
FIG. 1 is a diagram showing an example of the relationship between the amount of Fe ions in the electrolyte membrane, the molecular weight retention rate of the electrolyte polymer, and the amount of eluted fluorine when power generation of the fuel cell is conducted at a predetermined current density, 90° C. and 40% RH for 100 hours.

FIG. 1 is a diagram showing an example of the relationship between the amount of Fe ions in the electrolyte membrane, the molecular weight retention rate of the electrolyte polymer, and the amount of eluted fluorine when power generation of the fuel cell is conducted at a predetermined current density, 90° C. and 40% RH for 100 hours. As shown in FIG. 1, for example, when the initial amount of Fe ions in the electrolyte membrane is about 0.2 $\mu g/cm^2$ and when the amount of Fe ions in the electrolyte membrane is increased to 2 $\mu g/cm^2$ by the elution of Fe from a SUS separator or by the dissolution of solid Fe, the rate of eluted fluorine (FER) increases by about 100 times, and the degradation of the electrolyte membrane is accelerated by 100 times, therefore. For example, when the density of the electrolyte membrane is 1.5 $mg/cm^2$, 1 ppm corresponds to 0.0015 $\mu g/cm^2$, and 1500 ppm corresponds to 2 $\mu g/cm^2$.

Figure 2:
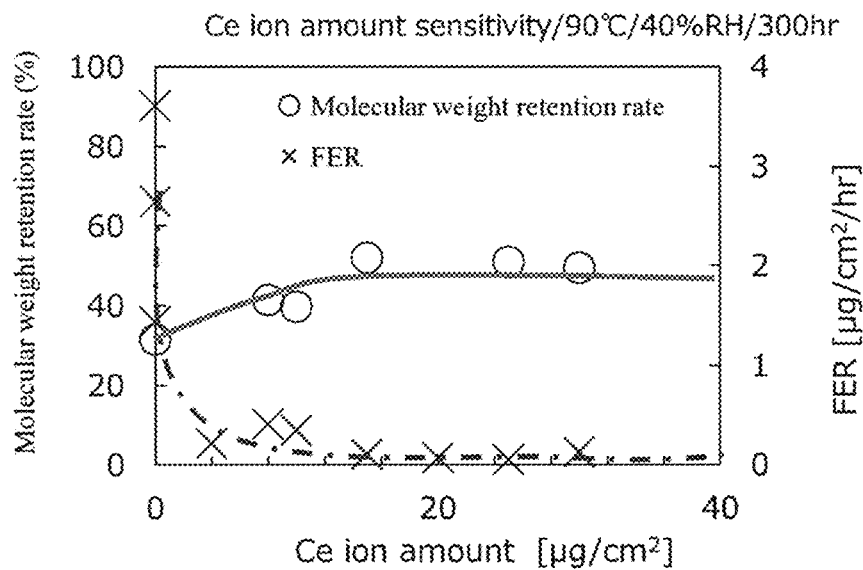
FIG. 2 is a diagram showing an example of the relationship between the amount of Ce ions in the electrolyte membrane, the molecular weight retention rate of the electrolyte polymer, and the amount of eluted fluorine when power generation of the fuel cell is conducted at a predetermined current density, 90° C. and 40% RH for 300 hours.

FIG. 2 is a diagram showing an example of the relationship between the amount of Ce ions in the electrolyte membrane, the molecular weight retention rate of the electrolyte polymer, and the amount of eluted fluorine when power generation of the fuel cell is conducted at a predetermined current density, 90° C. and 40% RH for 300 hours. As shown in FIG. 2, when Ce ions are contained in the electrolyte membrane, the amount of eluted fluorine decreases, and the degradation of the electrolyte membrane is suppressed, therefore.

From the above findings, in the detection of the degradation of the electrolyte membrane, quantifying the metal ions involved in the degradation of the electrolyte membrane, is more important than evaluating the degradation of the electrolyte membrane itself.

A novel method for detecting the degradation of electrolyte membranes was found, in which the amount of the metal ions that have a dominant influence on the degradation is simply and easily estimated based on the chemical degradation mechanism of electrolyte membranes.

The metal ions in the electrolyte membrane migrate in the electrolyte membrane by a voltage change due to external factors (electrophoresis).

In the disclosed embodiments, "WOT" (wide open throttle) means rapidly switching the fuel cell from an operational state at no or low current load to an operational state at high current load. For example, WOT simulates the behavior of a fuel cell vehicle when the accelerator is fully opened. The voltage of the fuel cell is lowered by WOT.

If the metal ions are contained in the electrolyte membrane when WOT is conducted, a time constant occurs in the response time of the voltage until the required voltage is reached. This is because the metal ions migrate behind the current change in order to follow the voltage changed in accordance with the high current load.

In addition, the mass transfer due to the high current load may involve water migration in the electrolyte membrane. Water migration has a dominant effect on the voltage response at a low relative humidity (RH) of about 30%, for example. On the other hand, if both of the electrodes of the fuel cell are sufficiently humidified and the water gradient is small (such as a high RH of about 80% RH), only the voltage response due to the migration of the metal ions can be obtained.

Figure 3:
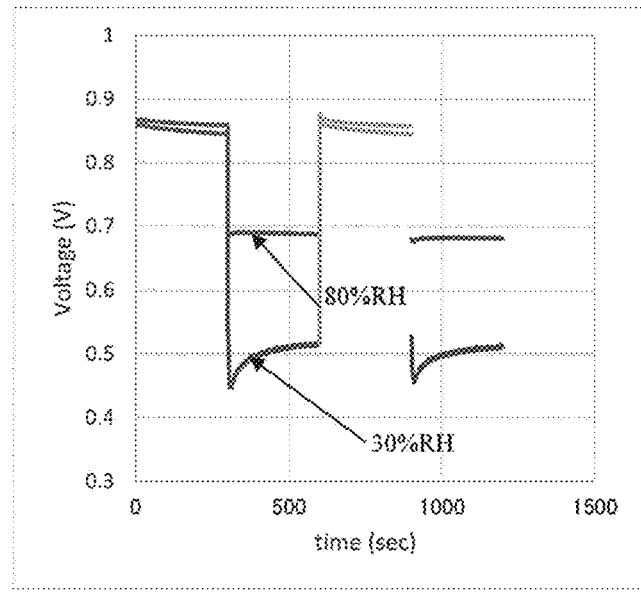
FIG. 3 is a graph having time on the x-axis and voltage on the y-axis and showing the response waveform of the voltage of the fuel cell at a low RH (30% RH) and a high RH (80% RH), the fuel cell including the electrolyte membrane containing a certain amount of Ce ions (4.3%)

FIG. 3 is a graph having time on the x-axis and voltage on the y-axis, and showing the response waveform of the voltage of the fuel cell at a low RH (30% RH) and a high RH (80% RH), the fuel cell including the electrolyte membrane containing a certain amount of Ce ions (4.3%).

At 30% RH, the amount of both of the electrodes of the fuel cell is small. Accordingly, when the current is swept, water migrates along with power generation and appears as a large resistance. On the other hand, if both of the electrodes are sufficiently wet and there is no difference in the amount of water between the electrodes, the resistance due to water migration is minimized, and the migration of the metal ions due to potential gradients appears as a resistance.

In addition, the metal ions differ in their ease of migration in the electrolyte membrane depending on ion size. For example, Fe ions that accelerate the degradation of the electrolyte membrane are small in size and rapidly diffuse in the electrolyte membrane. On the other hand, Ce ions which suppress the degradation of the electrolyte membrane are large in size and take a long time to migrate in the electrolyte membrane.

In the disclosed embodiments, using the difference in the diffusivity of the metal ion species in the electrolyte membrane, the amount of the metal ions in the electrolyte membrane and, as needed, the type of the metal ions are detected from the waveform of the voltage response when WOT is conducted, and the degradation of the electrolyte membrane is detected.

The fuel cell system of the disclosed embodiments estimates the amount of metal cations, which have a dominant effect on the chemical degradation of the electrolyte membrane, from the transient voltage response waveform at the time of current fluctuation, and the fuel cell system evaluates the degree of degradation of the electrolyte membrane from the estimated amount of the metal ions. More specifically, the time constant τ of the transient response in the CR circuit (first-order delay system) in which the migration of the metal ions in the electrolyte membrane is regarded as the capacitance component of the capacitor © is measured, and the amount of the metal ions and, as needed, the type of the metal ions are detected from the time constant τ.

According to the fuel cell system of the disclosed embodiments, chemical degradation of the electrolyte membrane can be detected at a stage prior to the rapid progress of the degradation, and the reduction of the gas barrier properties due to perforation of the electrolyte membrane or the like, can be suppressed.

In the disclosed embodiments, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

In general, the fuel cell system of the disclosed embodiments is installed and used in a vehicle including a motor as a driving source.

The fuel cell system of the disclosed embodiments may be installed and used in a vehicle that can be run by the power of a secondary cell.

The motor is not particularly limited, and it may be a conventionally-known driving motor.

The vehicle may be a fuel cell electric vehicle.

The vehicle may include the fuel cell system of the disclosed embodiments.

The fuel cell system of the disclosed embodiments includes the fuel cell, the fuel gas system, the oxidant gas system, the voltage detector, and the controller.

The fuel cell system of the disclosed embodiments includes the fuel cell.

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked, or 2 to 300 unit fuel cells may be stacked.

The fuel cell stack may include an end plate at both stacking-direction ends of each unit fuel cell.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer". As the anode catalyst and the cathode catalyst, examples include, but are not limited to, platinum, (Pt) and ruthenium (Ru). As a catalyst-supporting material and a conductive material, examples include, but are not limited to, a carbonaceous material such as carbon.

The cathode-side gas diffusion layer and the anode-side gas diffusion layer are collectively referred to as "gas diffusion layer".

The gas diffusion layer may be a gas-permeable electroconductive member or the like. From the viewpoint of suppressing the degradation of the electrolyte membrane, the gas diffusion layer may contain a cerium compound.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, an electrolyte polymer membrane such as a hydrocarbon electrolyte membrane and a fluorine electrolyte membrane (e.g., a thin, moisture-containing perfluorosulfonic acid membrane). The electrolyte membrane may be a Nafion membrane (manufactured by DuPont Co., Ltd.), for example. From the viewpoint of suppressing the degradation of the electrolyte membrane, the electrolyte membrane may contain a cerium compound.

As needed, each unit cell may have a microporous layer (MPL) between the catalyst layer and the gas diffusion layer. The microporous layer may contain a mixture of a water-repellent resin such as PTFE and an electroconductive material such as carbon black. From the viewpoint of suppressing the degradation of the electrolyte membrane, the microporous layer may contain a cerium compound.

As needed, each unit fuel cell may include two separators sandwiching both sides of the membrane electrode gas diffusion layer assembly. One of the two separators is an anode-side separator, and the other is a cathode-side separator. In the disclosed embodiments, the anode-side separator and the cathode-side separator are collectively referred to as "separator".

The separator may include supply and discharge holes for allowing the reaction gas and the refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flow path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to flow from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, an aluminum plate, a titanium plate and a stainless-steel plate) obtained by press-molding. The separator may function as a collector.

The fuel cell stack may include a manifold such as an inlet manifold communicating between the supply holes and an outlet manifold communicating between the discharge holes.

As the inlet manifold, examples include, but are not limited to, an anode inlet manifold, a cathode inlet manifold, and a refrigerant inlet manifold.

As the outlet manifold, examples include, but are not limited to, an anode outlet manifold, a cathode outlet manifold, and a refrigerant outlet manifold.

The fuel cell system may include, as the fuel gas system for supplying the fuel gas to the anode of the fuel cell, the fuel gas supplier, the fuel gas supply flow path, and the fuel off-gas discharge flow path.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply may be controlled by controlling the opening and closing of the main shutoff valve of the fuel gas supplier according to a control signal from the controller.

The fuel gas supply flow path connects the fuel gas inlet of the fuel cell and the fuel gas supplier. The fuel gas supply flow path allows the fuel gas to be supplied to the anode of the fuel cell. The fuel gas inlet may be the fuel gas supply hole, the anode inlet manifold or the like.

The fuel off gas discharge flow path may be connected to the fuel gas outlet of the fuel cell. The fuel off-gas discharge flow path discharges the fuel off-gas to the outside, which is the fuel gas discharged from the anode of the fuel cell. The fuel gas outlet may be the fuel gas discharge hole, the anode outlet manifold, or the like.

The fuel off-gas discharge valve (the vent and discharge valve) may be disposed in the fuel off-gas discharge flow path.

The fuel off-gas discharge valve allows the fuel off-gas, water and the like to be discharged to the outside (of the system). The outside may be the outside of the fuel cell system, or it may be the outside of the vehicle.

The fuel off-gas discharge valve may be electrically connected to the controller, and the flow rate of the fuel off-gas discharged to the outside may be controlled by controlling the opening and closing of the fuel off-gas discharge valve by the controller. By controlling the opening degree of the fuel off-gas discharge valve, the pressure of the fuel gas supplied to the anode (anode pressure) may be controlled.

The fuel off-gas may contain the fuel gas that has passed through the anode without reacting, and the water generated at the cathode and delivered to the anode. In some cases, the fuel off-gas contains corroded substances generated in the catalyst layer, the electrolyte membrane or the like, and the oxidant gas or the like allowed to be supplied to the anode during a purge.

As the oxidant gas system for supplying the oxidant gas to the cathode of the fuel cell, the fuel cell system may include an oxidant gas supplier, an oxidant gas supply flow path, and an oxidant off-gas discharge flow path.

The oxidant gas supplier supplies the oxidant gas to the fuel cell. More specifically, the oxidant gas supplier supplies the oxidant gas to the cathode of the fuel cell.

As the oxidant gas supplier, for example, an air compressor may be used.

The oxidant gas supplier is electrically connected to the controller. The oxidant gas supplier is driven according to a control signal from the controller. At least one selected from the group consisting of the flow rate and pressure of the oxidant gas supplied from the oxidant gas supplier to the cathode, may be controlled by the controller.

The oxidant gas supply flow path connects the oxidant gas supplier and the oxidant gas inlet of the fuel cell. The oxidant gas supply flow path allows the oxidant gas to be supplied from the oxidant gas supplier to the cathode of the fuel cell. The oxidant gas inlet may be the oxidant gas supply hole, the cathode inlet manifold, or the like.

The oxidant off-gas discharge flow path is connected to the oxidant gas outlet of the fuel cell. The oxidant off-gas discharge flow path allows the oxidant off-gas, which is the oxidant gas discharged from the cathode of the fuel cell, to be discharged to the outside. The oxidant gas outlet may be the oxidant gas discharge hole, the cathode outlet manifold, or the like.

The oxidant off-gas discharge flow path may be provided with an oxidant gas pressure control valve.

The oxidant gas pressure control valve is electrically connected to the controller. By opening the oxidant gas pressure control valve by the controller, the oxidant off-gas, which is the reacted oxidant gas, is discharged to the outside from the oxidant off-gas discharge flow path. The pressure of the oxidant gas supplied to the cathode (cathode pressure) may be controlled by controlling the opening degree of the oxidant gas pressure control valve.

The voltage detector detects the voltage of the fuel cell.

The voltage detector is electrically connected to the controller. The controller may detect the voltage of the fuel cell detected by the voltage detector.

As the voltage detector, a conventionally-known voltmeter or the like can be used. In the transient response measurement of the fuel cell voltage, the voltage detector may be a controller which is composed of a power generation circuit including a switch and a load and which is capable of adjusting the load to a predetermined output current.

The fuel cell system may include a refrigerant supplier and a refrigerant circulation flow path as the cooling system of the fuel cell.

The refrigerant circulation flow path communicates between the refrigerant supply and discharge holes provided in the fuel cell, and it allows the refrigerant supplied from the refrigerant supplier to be circulated inside and outside the fuel cell.

The refrigerant supplier is electrically connected to the controller. The refrigerant supplier is driven according to a control signal from the controller. The flow rate of the refrigerant supplied from the refrigerant supplier to the fuel cell, is controlled by the controller. The temperature of the fuel cell may be controlled thereby.

As the refrigerant supplier, examples include, but are not limited to, a cooling water pump.

The refrigerant circulation flow path may be provided with a radiator for heat dissipation from the cooling water.

The refrigerant circulation flow path may be provided with a reserve tank for storing the refrigerant.

The fuel cell system may include a secondary cell.

The secondary cell (battery) may be any chargeable and dischargeable cell. For example, the secondary cell may be a conventionally known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the motor, the oxidant gas supplier and the like. The secondary cell may be rechargeable by a power source outside the vehicle, such as a household power supply. The secondary cell may be charged by the output power of the fuel cell. The charge and discharge of the secondary cell may be controlled by the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to an ignition switch which may be installed in the vehicle. The controller may be operable by an external power supply even if the ignition switch is turned off.

The controller preliminarily stores the initial time constant τ0 derived from the first transient response waveform of the voltage of the fuel cell, which is obtained by increasing the output current value of the fuel cell in the predetermined output current value increasing condition at the time of initial operation of the fuel cell.

In general, the time constant is a response time between when the current is loaded and when a desired voltage is reached.

In the disclosed embodiments, the initial time constant τ0 is a response time to reach a desired voltage derived from the first transient response waveform of the voltage of the fuel cell, which is obtained by increasing the output current value of the fuel cell in the predetermined output current value increasing condition at the time of initial operation of the fuel cell.

In the disclosed embodiments, the time constant τ is a response time to reach a desired voltage derived from the second transient response waveform of the voltage of the fuel cell, which is obtained by increasing the output current value of the fuel cell in the predetermined output current value increasing condition.

The time of initial operation of the fuel cell may be the time when the fuel cell is produced and operated at the first time, or it may be every time the operation of the fuel cell is started (the operation starting time).

The predetermined output current value increasing condition corresponds to the above-described WOT, and it may be the condition for operating the fuel cell by, when the fuel cell is operated at the first current density, switching the first current density to the second current density which is larger than the first current density. The second current density may be 10 to 60 times the first current density.

The first current density may be from 0.05 A/cm$^2$ to 0.2 A/cm$^2$, for example.

The second current density may be from 1 A/cm$^2$ to 3 A/cm$^2$, for example.

The relative humidity (RH) may be from 60% to 95%, from the viewpoint of suppressing the influence of water.

From the viewpoint of promoting electrophoresis of the metal ions, the fuel cell operating temperature may be from 65° C. to 90° C., for example.

The desired voltage of the transient response waveform may be a targeted voltage, or it may be 63% of the targeted voltage.

The control unit stores in advance a data group indicating the relationship between the second transient response waveform of the voltage of the fuel cell obtained by increasing the output current value of the fuel cell at a predetermined output current value increasing condition and the amount of metal ions contained in the electrolyte membrane of the fuel cell. The control unit may further store in advance a data group indicating a relationship between the second transient response waveform and the type of metal ions included in the electrolyte membrane of the fuel cell, if necessary. When the diagnosis is performed on the assumption that only one type of metal ion is included in the electrolyte membrane, a data group indicating the relationship between the second transient response waveform and the amount of metal ion included in the electrolyte membrane of the fuel cell may be stored in advance. When diagnosis is performed on the assumption that two or more kinds of metal ions are included in the electrolyte membrane, a data group indicating the relationship between the second transient response waveform and the kind of metal ions included in the electrolyte membrane of the fuel cell may be stored in advance. For example, when it is assumed that only Fe ions are metal ions involved in the degradation of the electrolyte membrane, a data group indicating the relationship between the second transient response waveform and the amount of Fe ions contained in the electrolyte membrane of the fuel cell may be stored in advance. For example, when it is assumed that the metal ions involved in the degradation of the electrolyte membrane are two kinds of Fe ions and Ce ions, a data group indicating the relationship between the second transient response waveform and the amount of Fe ions contained in the electrolyte membrane of the fuel cell, a data group indicating the relationship between the second transient response waveform and the amount of Ce ions contained in the electrolyte membrane of the fuel cell, a second transient response waveform, a data group indicating the relationship between Ce ions and Fe ions contained in the electrolyte membrane of the fuel cell, and the like may be stored in advance.

[Attribution of the Type and Amount of the Metal Ions]

The controller may preliminarily store the data group relating to the transient response waveforms specific to the types of the metal ions in a predetermined amount, and the transient response waveforms in the case of combining several types of metal ions in a predetermined amount. The predetermined amount may be appropriately determined by empirical rules.

Figure 4:
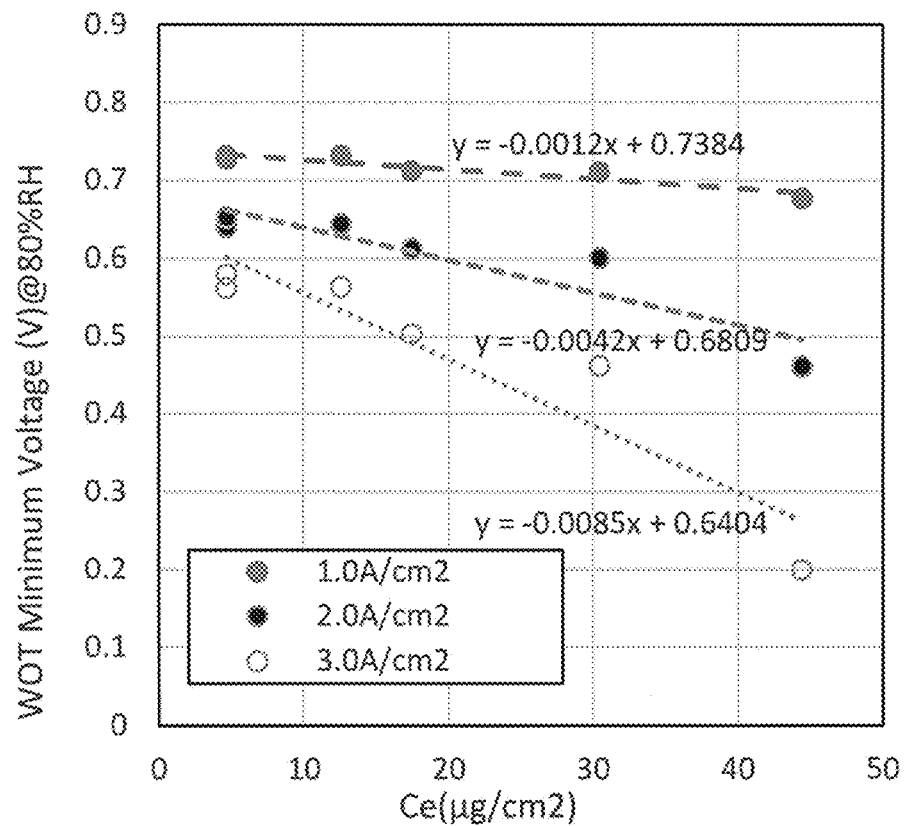
FIG. 4 is a graph showing an example of the relationship between the amount of Ce in the electrolyte membrane at the time of power generation of the fuel cell at a current density of 1.0 mA/cm$^2$, 2.0 mA/cm$^2$ and 3.0 mA/cm$^2$, and the minimum voltage of the fuel cell just after WOT is conducted.

FIG. 4 is a graph showing an example of the relationship between the amount of Ce in the electrolyte membrane at the time of power generation of the fuel cell at a current density of 1.0 mA/cm$^2$, 2.0 mA/cm$^2$ and 3.0 mA/cm$^2$, and the minimum voltage of the fuel cell just after WOT is conducted.

Figure 5:
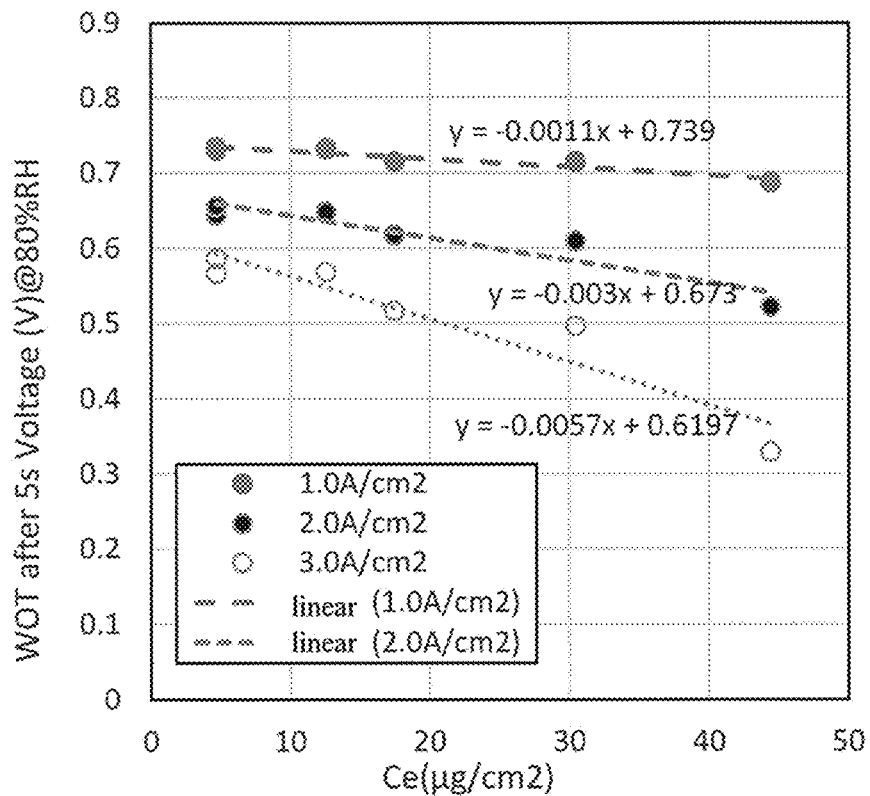
FIG. 5 is a graph showing an example of the relationship between the amount of Ce in the electrolyte membrane at the time of power generation of the fuel cell at a current density of 1.0 mA/cm$^2$, 2.0 mA/cm$^2$ and 3.0 mA/cm$^2$, and the voltage of the fuel cell 5 seconds after WOT.

FIG. 5 is a graph showing an example of the relationship between the amount of Ce in the electrolyte membrane at the time of power generation of the fuel cell at a current density of 1.0 mA/cm$^2$, 2.0 mA/cm$^2$ and 3.0 mA/cm$^2$, and the voltage of the fuel cell 5 seconds after WOT.

Figure 6:
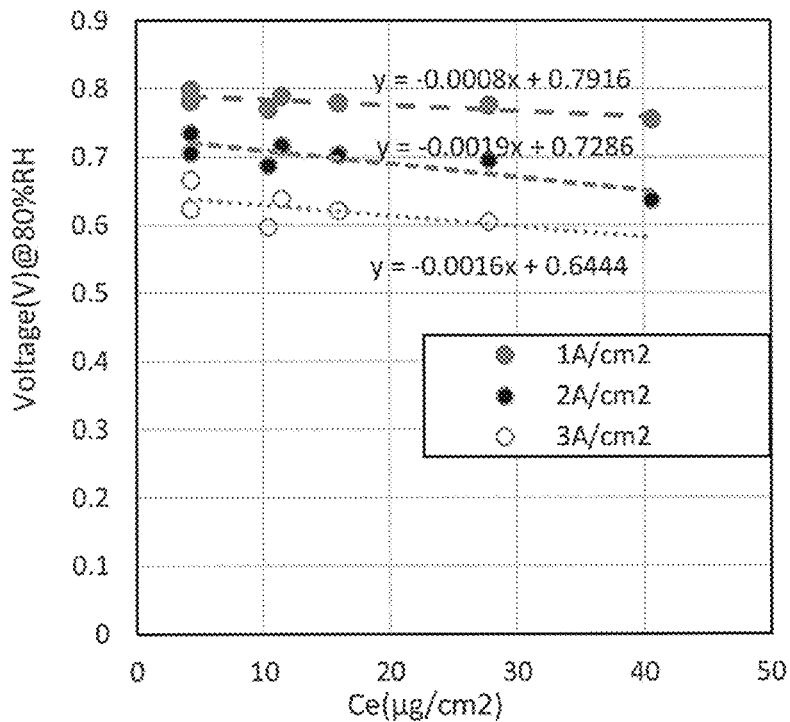
FIG. 6 is a graph showing an example of the relationship between the amount of Ce in the electrolyte membrane at the time of power generation of the fuel cell at a current density of 1.0 mA/cm$^2$, 2.0 mA/cm$^2$ and 3.0 mA/cm$^2$, and the voltage of the fuel cell just after the normal operation of the fuel cell is conducted.

FIG. 6 is a graph showing an example of the relationship between the amount of Ce in the electrolyte membrane at the time of power generation of the fuel cell at a current density of 1.0 mA/cm$^2$, 2.0 mA/cm$^2$ and 3.0 mA/cm$^2$, and the voltage of the fuel cell just after the normal operation of the fuel cell is conducted.

Figure 7:
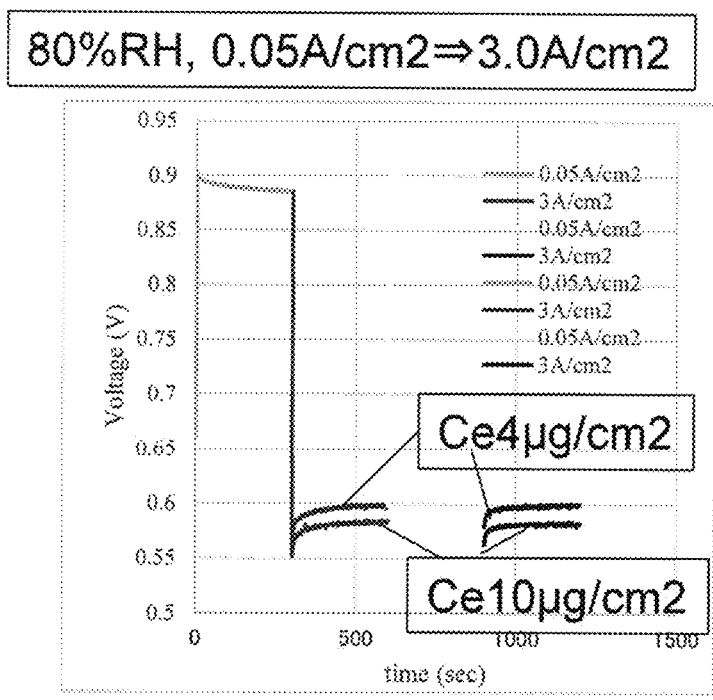
FIG. 7 is a graph showing, for a fuel cell including an electrolyte membrane containing Ce (4 µg/cm$^2$) and a fuel cell including an electrolyte membrane containing Ce (10 µg/cm$^2$), an example of the transient response waveform of the voltage of each of the fuel cells when WOT is conducted thereon.
Figure 8:
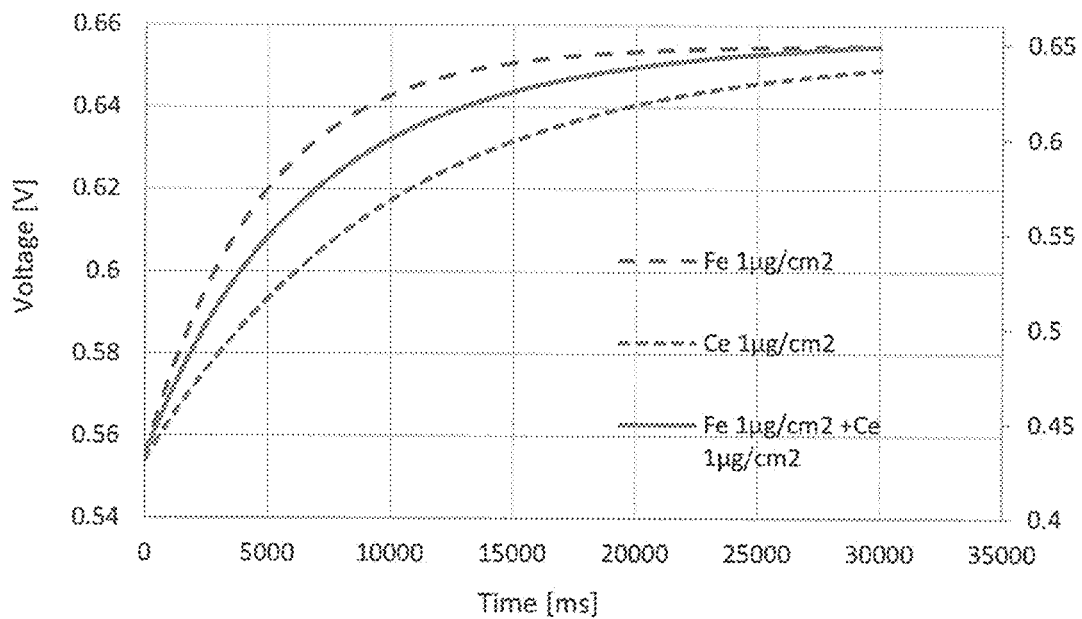
FIG. 8 is a graph showing, for a fuel cell including an electrolyte membrane containing Ce, a fuel cell including an electrolyte membrane containing Fe, and a fuel cell including an electrolyte membrane containing Ce and Fe, an example of the transient response waveform of the voltage of each of the fuel cells when WOT is conducted thereon under a predetermined current increasing condition.

FIG. 7 is a graph showing, for a fuel cell including an electrolyte membrane containing Ce (4 μg/cm$^2$) and a fuel cell including an electrolyte membrane containing Ce (10

μg/cm²), an example of the transient response waveform of the voltage of each of the fuel cells when WOT is conducted thereon;

FIG. 8 is a graph showing, for a fuel cell including an electrolyte membrane containing Ce, a fuel cell including an electrolyte membrane containing Fe, and a fuel cell including an electrolyte membrane containing Ce and Fe, an example of the transient response waveform of the voltage of each of the fuel cells when WOT is conducted thereon under a predetermined current increasing condition.

From the evaluation of the responsivities of the fuel cells including the Ce-containing electrolyte membranes shown in FIGS. 4 to 6, it can be seen that the fuel cell voltage varies with the amount of Ce ions relative to the current density.

From the transient response waveforms of the voltages of the fuel cells including the Ce-containing electrolyte membranes shown in FIG. 7, it can be seen that the time constant varies with the amount of Ce ions.

From the transient response waveforms shown in FIG. 8, that is, from the transient response waveform of the voltage of the fuel cell including the Ce-containing electrolyte membrane, the transient response waveform of the voltage of the fuel cell including the Fe-containing electrolyte membrane, and the transient response waveform of the voltage of the fuel cell including the electrolyte membrane containing Ce and Fe, it can be seen that the time constant varies depending on the type of the metal ions contained in the electrolyte membrane.

The time constant is inherent in the size and diffusivity of the metal ions. Accordingly, by combining the time constant, the current density condition and the metal ion concentration, it is possible to specify what kind of metal ions are contained in the electrolyte membrane and what the amount is. For example, when a large amount of Ce is initially added to the electrolyte membrane and then is discharged to the outside of the system, the time constant is decreased, and the voltage response is improved. The transient response waveform of the voltage of the fuel cell can be used to detect whether or not the Ce ions contained in the electrolyte membrane have decreased, and whether or not Fe ions, a foreign substance or the like has entered the electrolyte membrane, for example.

Even when several types of metal ions are contained in the electrolyte membrane, the types and amounts of the metal ions can be estimated by preliminarily storing the data relating to the transient response waveforms of several types of metal ions (such as Ce and Fe) having different time constants. Accordingly, it is possible to determine whether the amount of Ce ions decreases to increase the amount of Fe ions, and conversely. From the amounts, it is possible to diagnose the degradation state of the electrolyte membrane.

The metal ions may be at least one kind of metal cations selected from the group consisting of Ce ions, Fe ions, Al ions and Ti ions.

Of the metal ions, those which suppress the degradation of the electrolyte membrane are mainly Ce ions, and those which accelerate the degradation of the electrolyte membrane are Fe ions, Al ions, Ti ions, and the like.

Fe ions may be mixed into the fuel cell in the process of producing the fuel cell. The pH in the system may be decreased by an acid generated by decomposition of the electrolyte membrane; Fe mixed into the fuel cell may be eluted; and Fe ions may enter the electrolyte membrane.

Also, Fe ions may be contained in a component such as a separator. The pH in the system may be decreased by the acid generated by the decomposition of the electrolyte membrane; a part of Fe contained in the component may be eluted; and Fe ions may enter the electrolyte membrane.

Ce ions may be contained in the electrolyte membrane, the gas diffusion layer (GDL) or the MPL. The Ce ions contained in the electrolyte membrane are bound to the sulfonic acid group of the electrolyte polymer. The Ce ions may be eluted from the electrolyte membrane along with the decomposition of the electrolyte membrane, and the amount of the Ce ions in the electrolyte membrane may decrease. When Ce is contained in the gas diffusion layer (GDL) and the MPL, the pH in the system may be decreased by the acid generated by the decomposition of the electrolyte membrane; the Ce contained in the gas diffusion layer (GDL) and the MPL may be eluted; Ce ions may be mixed into the electrolyte membrane; and the amount of the Ce ions in the electrolyte membrane may be increased.

Accordingly, the degradation of the electrolyte membrane may be detected by using an increase or decrease in metal ions as an indicator, depending on the members or configuration of the fuel cell.

For example, in the case of the fuel cell in which Ce ions are contained in the electrolyte membrane and the gas diffusion layer (GDL) and which includes a SUS separator, an increase or decrease in Fe ions in the electrolyte membrane and an increase or decrease in Ce ions therein, may be used as the indicator for detecting the degradation.

For example, in the case of the fuel cell in which Ce ions are contained in the electrolyte membrane and the gas diffusion layer (GDL) and which includes a Ti separator, the following three factors may be used as the indicator for detecting the degradation: an increase in Fe ions in the electrolyte membrane, an increase or decrease in Ce ions in the electrolyte membrane, and an increase or decrease in Ti ions in the electrolyte membrane. In this case, it is assumed that in the process of producing the fuel cell, Fe is mixed into the fuel cell as a foreign substance, and the foreign substance is dissolved, thereby mixing Fe ions into the electrolyte membrane.

The controller diagnoses the degradation of the electrolyte membrane of the fuel cell at a predetermined time.

The predetermined time to diagnose the degradation of the electrolyte membrane of the fuel cell may be, for example, the time of depressing the accelerator pedal of a vehicle in which the fuel cell system is installed. That is, according to the fuel cell system of the present disclosure, the degradation of the electrolyte membrane can be simply diagnosed while running the vehicle.

In the electrolyte membrane degradation diagnosis, the controller acquires the time constant $\tau$ derived from the second transient response waveform, and the controller determines whether or not the time constant $\tau$ is smaller than the initial time constant $\tau 0$.

From the viewpoint of increasing the accuracy of the electrolyte membrane degradation diagnosis, in determining whether or not the time constant $\tau$ is smaller than the initial time constant $\tau 0$, the controller may determine whether or not the time constant $\tau$ is equal to or less than 90% of the initial time constant $\tau 0$ when the initial time constant $\tau 0$ is regarded as 100%.

When the controller determines that the time constant $\tau$ is smaller than the initial time constant $\tau 0$, the controller estimates the amount of the metal ions (and the type of the metal ions, as needed) by comparing the second transient response waveform with the data group. From the viewpoint of increasing the accuracy of the electrolyte membrane degradation diagnosis, when the controller determines that the time constant $\tau$ is equal to or less than 90% of the initial time constant τ0, the controller may estimate the amount of the metal ions by comparing the second transient response waveform with the data group. When the diagnosis is conducted by assuming that only one type of metal ions are contained in the electrolyte membrane and involved in the degradation of the electrolyte membrane, the amount of the metal ions may be estimated. When the diagnosis is conducted by assuming that two or more kinds of metal ions are contained in the electrolyte membrane and involved in the degradation of the electrolyte membrane, the amounts and types of the two or more kinds of the metal ions may be estimated.

The controller determines whether or not the estimated amount of the metal ions is within the predetermined threshold range.

When the controller determines that the estimated amount of the metal ions is outside the predetermined threshold range, the controller diagnoses the electrolyte membrane as being degraded.

When the metal ions are at least one kind of metal ions selected from the group consisting of Fe ions, Al ions and Ti ions, the controller may determine whether or not the estimated amount of the at least one kind of metal ions selected from the group consisting of Fe ions, Al ions and Ti ions exceeds the predetermined threshold, and when the controller determines that the estimated amount of the at least one kind of metal ions selected from the group consisting of Fe ions, Al ions and Ti ions exceeds the predetermined threshold, the controller may diagnose the electrolyte membrane as being degraded.

When the metal ions are Ce ions, the controller may determine whether or not the estimated amount of the Ce ions is less than the predetermined threshold, and when the controller determines that the estimated amount of the Ce ions is less than the predetermined threshold, the controller may diagnose the electrolyte membrane as being degraded.

FIG. 9 is a flowchart illustrating an example of the control of the fuel cell system of the disclosed embodiments.

The controller preliminarily stores the data group indicating the relationship between the second transient response waveform of the voltage of the fuel cell, which is obtained by increasing the output current value of the fuel cell in the predetermined output current value increasing condition, and the amount of the metal ions contained in the electrolyte membrane of the fuel cell.

The controller starts to diagnose the degradation of the electrolyte membrane of the fuel cell.

The controller obtains the second transient response waveform of the voltage of the fuel cell by increasing the output current value of the fuel cell in the predetermined output current value increasing condition. Then, the controller acquires the time constant τ from the second transient response waveform.

The controller determines whether or not the time constant τ is smaller than the preliminarily-stored initial time constant τ0.

When the controller determines that the time constant τ is the same as or equivalent to the initial time constant τ0, the controller ends the control, or it diagnoses the electrolyte membrane as not being degraded. When the controller determines that the time constant τ is smaller than the initial time constant τ0, the controller estimates the amount of the metal ions by comparing the second transient response waveform with the preliminarily-stored data group. As needed, the controller may estimate the type of the metal ions.

The controller determines whether or not the estimated amount of the metal ions is within the predetermined threshold range.

When the controller determines that the estimated amount of the metal ions is outside the predetermined threshold range, the controller diagnoses the electrolyte membrane as being degraded. On the other hand, when the controller determines that the estimated amount of the metal ions is within the predetermined threshold range, the controller ends the control, or it diagnoses the electrolyte membrane as not being degraded.

The invention claimed is:

1. A fuel cell system comprising:
a fuel cell,
a fuel gas system for supplying fuel gas to an anode of the fuel cell,
an oxidant gas system for supplying oxidant gas to a cathode of the fuel cell,
a voltage detector for detecting a voltage of the fuel cell, and
a controller,
wherein the controller preliminarily stores an initial time constant τ0 derived from a first transient response waveform of the voltage of the fuel cell, which is obtained by increasing an output current value of the fuel cell in a predetermined output current value increasing condition at the time of initial operation of the fuel cell;
wherein the controller preliminarily stores a data group indicating a relationship between a second transient response waveform of the voltage of the fuel cell, which is obtained by increasing the output current value of the fuel cell in the predetermined output current value increasing condition, and an amount of metal ions contained in an electrolyte membrane of the fuel cell;
wherein the controller diagnoses degradation of the electrolyte membrane of the fuel cell at a predetermined time;
wherein, in the electrolyte membrane degradation diagnosis, the controller acquires a time constant τ derived from the second transient response waveform;
wherein the controller determines whether or not the time constant τ is smaller than the initial time constant τ0;
wherein, when the controller determines that the time constant τ is smaller than the initial time constant τ0, the controller estimates the amount of the metal ions by comparing the second transient response waveform with the data group;
wherein the controller determines whether or not the estimated amount of the metal ions is within a predetermined threshold range; and
wherein, when the controller determines that the estimated amount of the metal ions is outside the predetermined threshold range, the controller diagnoses the electrolyte membrane as being degraded.

2. The fuel cell system according to claim 1, wherein the metal ions are at least one kind of metal ions selected from the group consisting of Ce ions, Fe ions, Al ions and Ti ions.

3. The fuel cell system according to claim 1,
wherein the metal ions are Fe ions;
wherein the controller determines whether or not the estimated amount of the Fe ions exceeds a predetermined threshold; and wherein, when the controller determines that the estimated amount of the Fe ions exceeds the predetermined threshold, the controller diagnoses the electrolyte membrane as being degraded.

4. The fuel cell system according to claim 1, wherein the predetermined output current value increasing condition is a condition for operating the fuel cell by, when the fuel cell is operated at the first current density, switching the first current density to a second current density which is larger than the first current density.

5. The fuel cell system according to claim 4, wherein the second current density is 10 to 60 times the first current density.

6. The fuel cell system according to claim 1, wherein, in determining whether or not the time constant $\tau$ is smaller than the initial time constant $\tau 0$, the controller determines whether or not the time constant $\tau$ is equal to or less than 90% of the initial time constant $\tau 0$ when the initial time constant $\tau 0$ is regarded as 100%.

* * * * *